United States Patent [19]

Cooke

[11] 4,253,494
[45] Mar. 3, 1981

[54] CONSTANT SPEED UNI-DIRECTIONAL ROTARY SEQUENCE VALVE

[75] Inventor: John Cooke, Bolton, England

[73] Assignee: Coal Industry (Patents) Limited, England

[21] Appl. No.: 970,137

[22] Filed: Dec. 18, 1978

[30] Foreign Application Priority Data

Jan. 17, 1978 [GB] United Kingdom ............... 01737/78

[51] Int. Cl.³ ............................................. F16K 11/02
[52] U.S. Cl. ............................ 137/625.23; 137/625.15
[58] Field of Search ....................... 137/625.11, 625.15, 137/625.21, 625.22, 625.23, 625.24

[56] References Cited

U.S. PATENT DOCUMENTS

| 646,618 | 4/1900 | Christensen | 137/625.21 |
|---|---|---|---|
| 1,136,589 | 4/1915 | Davis | 137/625.21 X |
| 2,844,167 | 7/1958 | Griswold | 137/625.21 |
| 2,979,963 | 4/1961 | Snoy | 137/625.11 X |
| 3,520,327 | 7/1970 | Claydon et al. | 137/625.11 X |

FOREIGN PATENT DOCUMENTS

| 1085439 | 10/1967 | United Kingdom . |
| 1200456 | 7/1970 | United Kingdom . |
| 1287254 | 8/1972 | United Kingdom . |
| 1418507 | 12/1975 | United Kingdom . |

Primary Examiner—William R. Cline
Attorney, Agent, or Firm—Stevens, Davis, Miller & Mosher

[57] ABSTRACT

A rotary sequence valve comprises a body defining an inlet port and a plurality of outlet ports, a rotary valve member housed within the body and defining a flow passage having an inlet in fluid communication with the inlet port and an outlet sequentially fluid connected to each of the plurality of outlet ports, the defined flow passage outlet being elongate in the direction of movement to maintain a maximum fluid flow connection between the flow passage outlet and an outlet port, the flow passage outlet and outlet ports being configured such that fluid flow from the flow passage outlet to one of the outlet ports ceases before fluid flow from the flow passage outlet to another outlet port commences, and drive means provided for continuously rotating the valve member relative to the body.

3 Claims, 5 Drawing Figures

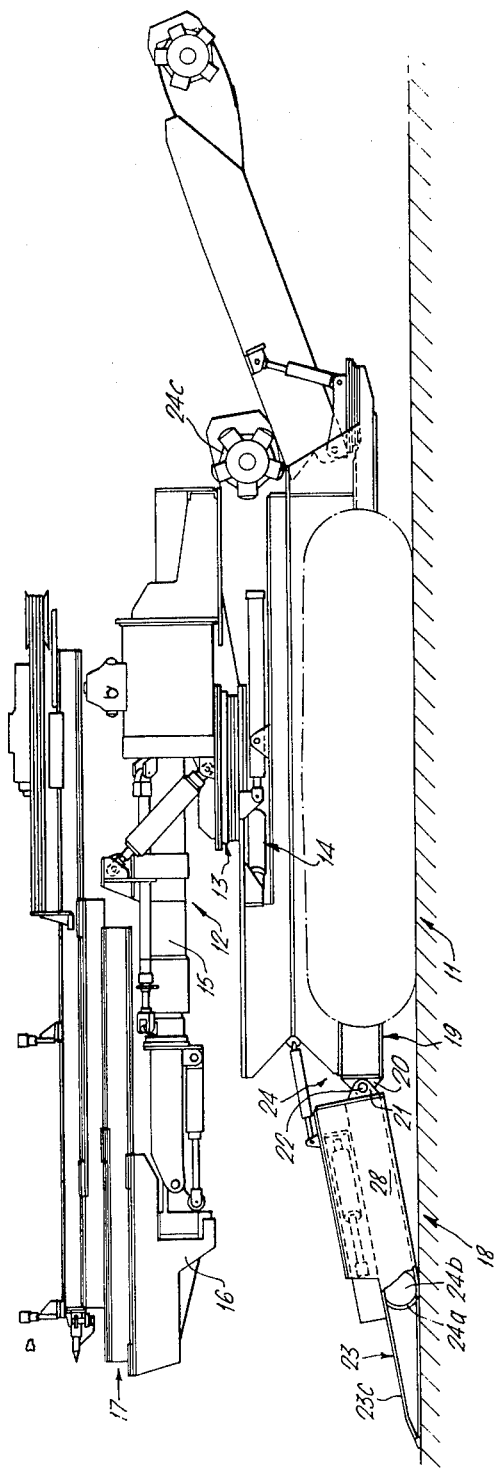

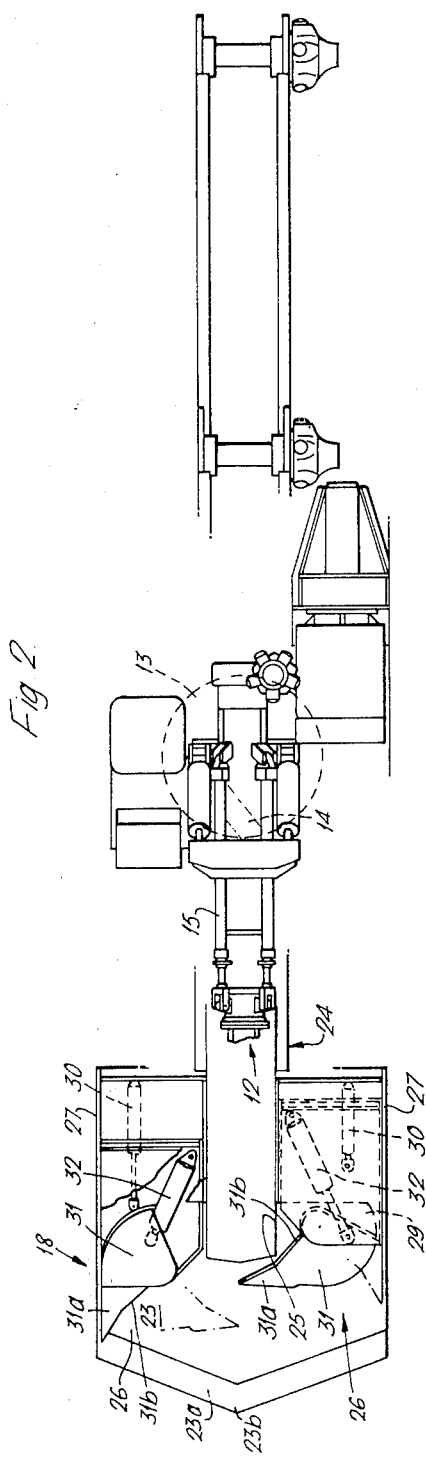

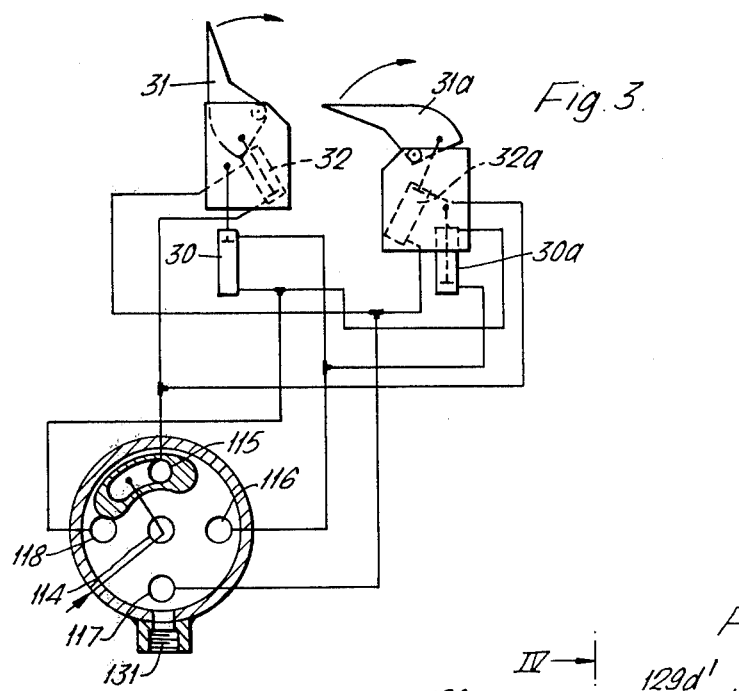
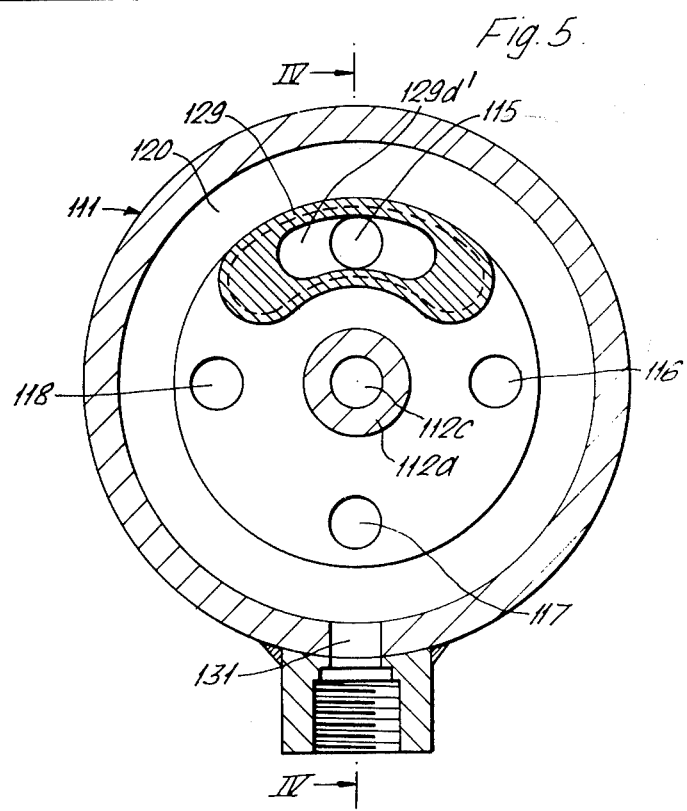

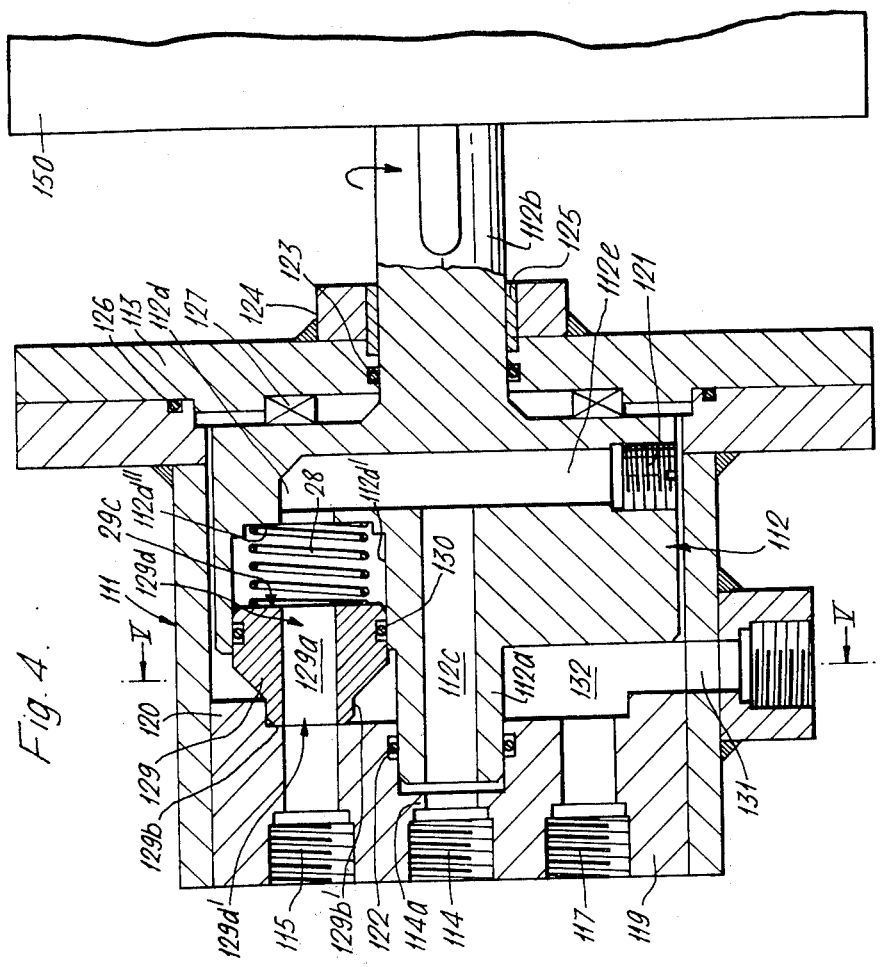

CONSTANT SPEED UNI-DIRECTIONAL ROTARY SEQUENCE VALVE

The invention relates to a fluid flow control valve, and has more particular reference to a rotary sequence valve for use in controlling the operation of a plurality of fluid operation piston and cylinder arrangements.

According to one aspect of the invention, there is proposed a rotary sequence valve comprising a body part, a valve member part rotatably mounted in the body part, an inlet port and a plurality of flow ports defined in the body part, and a flow passage in such valve member part in fluid flow connection with the inlet port, the valve member part being adapted, upon rotation to connect the inlet port sequentially with respective ones of the flow ports, there being drive means adapted continuously to rotate the valve member part relative to the body part.

According to another aspect of the invention there is proposed a rotary sequence valve comprising a body part, a valve member part rotatably mounted in the body part, an inlet port and a plurality of flow ports defined in the body part, and a flow passage in the valve member part in fluid flow connection with the inlet port, the valve member part being adapted, upon rotation, to connect the inlet port sequentially with respective ones of the said flow ports, wherein the at least one of the parts has a port defined therein which is elongate in the direction of movement of valve member part thereby to maintain a maximum fluid flow connection between the body part and the valve member part during limited relative movement between the two parts, there being an outlet port with which, in use, those flow ports not in fluid flow connection with the inlet port are connected.

Preferably, the elongate port is defined by the valve member part. Alternatively, the flow ports on the body part may be made of elongate form.

The functions of the inlet and outlet ports are interchangeable.

According to a preferred feature, the valve member part includes an axially extending spigot having a flow passage in register with the inlet port and in fluid flow connection with a further passage in spaced disposition relative to the first mentioned such passage, the flow ports being arranged on a pitch circle in axial register with the further passage and being connectable therewith, and there being a chamber defined within the valve body part and in fluid flow connection with the flow ports and with the outlet port, the valve member part being adapted to isolate that flow port for the time being in fluid flow connection with the further passage from the chamber.

The invention will now be described by way of example only, with reference to the accompanying drawings illustrating one embodiment thereof and in which:

FIG. 1 is a side elevation of a track mounted mining machine for use in mineworkings and having gathering-arm type loading equipment adapted to be controlled by a rotary sequence valve constructed in accordance with the invention;

FIG. 2 is an incomplete plan of the mining machine shown in FIG. 1, partly broken away and with parts omitted so as more clearly to show the gathering-arm type loading equipment;

FIG. 3 is a line diagram showing the hydraulic circuit diagram between actuating rams for the loading equipment and control valve means for effecting the sequential operation of the loading equipment;

FIG. 4 is a sectional view of the rotary sequence valve constituting part of the control valve means and constructed in accordance with the present invention, the section being taken along line IV—IV of FIG. 5; and FIG. 5 is a sectional view along line V—V of FIG. 4.

Referring now to FIGS. 1 and 2 of the drawings, a track mounted mining machine comprises a carriage 11 having a mounting boom 12 supported on a turntable 13 thereon for angular adjustment about a vertical axis by ram means 14 extending between and connected with the carriage and turntable. The mounting boom 12 is extensible and retractable under the control of rams 15, and the forward end thereof carries a support platform 16 mounted for angular adjustment about horizontal axes extending longitudinally and transversely of the carriage and about a vertical axis. The support platform 16 carries an extensible boom arrangement 17 which supports a single drilling mast or supports a plurality of such masts.

Gathering-arm type loading equipment 18 is provided at the forward end of the carriage 11, being articularly connected with a support structure 19 mounted on such carriage by co-operating lugs 20, 21 on the carriage and support structure respectively and by a pin 22 engaged with such lugs.

The loading equipment comprises an apron 23 of generally rectangular form, when viewed in plan, which apron is symmetrically disposed with respect to the centre-line of the carriage, a conveyor means 24 extending forwardly into a correspondingly shaped cut-out 25 in the apron, and a respective gathering-arm unit 26 at each side of the conveyor means, the units 26 being operable in combination, to transfer spoil existing on the apron from such apron to the conveyor.

When viewed in side elevation, the apron is of wedge shape, the forward end having a hardened, wear-resistant tip 23a, thus to resist wear thereto arising from forcing the apron into or beneath the spoil by advance of the tracked carriage. The forward edge, when viewed in plan, terminates in a point 23b.

A respective support frame 27 is provided at each side of the cut-out 25, the support frames being integral with the apron, extending both above and below the plane of the support surface 23c thereof, and each serving to provide a housing 28 within which a respective gathering-arm unit 26 is movably mounted. Each frame is of open-fronted, box-like form.

Each gathering-arm unit 26 comprises a box-like sweep arm carrier 29 mounted in a respective support frame 27 for movement between positions corresponding to the positions of the carrier shown in the upper and lower parts respectively of FIG. 2 of the drawings under the control of a thrust ram 30 connected between the support frame 27 and carrier 29. The units 26 each include a sweep arm component 31 extending outwardly of the carrier and pivotal therein between positions corresponding to the positions of the arms 31 as shown in FIG. 2 under the control of a respective cam ram 32 provided between the carrier 29 and arm 31. Each sweep arm 31 is of segmental form and has a forwardly extending toe 31a and a cranked front edge 31b. The forward end of the sweep arm carrier 29 is partially closed to provide a barrier to the ingress of spoil and the like to the interior of the carrier. The toe 31a of the sweep arm may be detachable, to permit of the fitting of a replacement tip as necessary, while the front or leading edge of the arm may be toothed and/or otherwise than perpendicular to the plane of the support surface of the apron.

The conveyor means 24 is of a scraper chain type, thereby ensuring a low profile, and comprises a conveyor band 24a trained around rollers 24b, 24c, the latter being driven by hydraulic or other motor, the support surface of the conveyor 24a being straight and co-planar with the corresponding surface of the apron. The provision of a conveyor of a lesser width than the apron and the utilization of a support roller 24b of a width corresponding to that of the conveyor will allow of the downward and outward inclination of the flanks of the apron if desired. The inclination of the support surface of the apron will be determined, at least in part, by the diameter of roller 24b, having regard to the need for a sufficient clearance between the said support surface and the ground to accommodate the roller at a forward position on the apron.

In operation each gathering-arm unit undergoes a four-stroke sequence, namely inward pivoting of the sweep arm component, withdrawal of the carrier into the related support frame, outward pivoting of the arm, and advance of the carrier outwardly from the support frame. The sequences of the two units operate out of phase such that as one carrier is being withdrawn to transfer spoil to the conveyor, the other carrier is advancing with the sweep arm carried thereby in its outwardly pivoted position.

The various rams 30, 32 are preferably supplied with hydraulic fluid under pressure through a common control (see FIGS. 3, 4 and 5) thereby to ensure the requisite sequential operation of such rams and of the structures controlled thereby.

Referring now particularly to FIGS. 3, 4 and 5 of the drawings, the control valve means includes a rotary valve comprising a flanged, cylindrical body part 111 having a closed end thereto, a disc-like valve member 112 mounted in and coaxially with the said body and rotatable therein, and a cover plate 113 secured to the said body part and holding the valve member captive thereto.

Five through ports are provided in the closed end of the body part, one such port 114 being positioned centrally thereof and the remaining ports 115, 116, 117 and 118 being arranged at ninety degree intervals on a circle concentric with the body part. At its inner end port 114 is counterbored to define a shoulder 114a, while the interface of end plate 119 is recessed to form an axially extending peripheral flange 120.

Valve member 112 is a clearance fit within the body part and the opposite faces thereof are formed with a spigot 112a and a drive spindle 112b, such spigot and drive spindle being fixedly secured with the valve member. A bore 112c is provided at a position spaced from the opposite wall of such member, while mutually connecting blind bores 112d, 112e are provided in spaced parallel dispositions relative to bore 112c and radially of the valve member, respectively. Bore 112d is counterbored at that side of the valve member facing end plate 119, while the outer end of blind bore 112e, which bore is in fluid flow connection with centrally disposed blind bore 112c, is sealed by a closure plug 121.

Spigot 112a is a close but free fit within the counterbored inner end of port 113, and a sealing ring 122 is located within a peripheral channel in the wall of such inner end to seal against the surface of the spigot.

Drive spindle 12b extends outwardly of cover plate 113 through a centrally disposed aperture therein, there being a sealing ring 123 in a channel in the wall of such aperture to seal against the surface of the spindle 112b. An annular collar 124 is secured to the outer face of the cover plate 113 in coaxial relationship to the aperture therein and a wear resistant sleeve 125 is provided radially inwardly of the collar and between such collar and the spindle.

A further sealing ring 126 is located in a groove provided in the outer annular face of the flange 111a to the body part and bears against the opposed face of the cover plate 113.

A needle thrust bearing 127 is interposed between the outer face of the valve member 112 and the opposing face of the cover plate 113.

The counterbored inner end of bore 112d receives a rearwardly extending cylindrical enlargement 129a of a connector member 129 as a close but sliding fit therein, there being a compression spring 128 interposed between the end face of enlargement 129a and an annular shoulder 112d' formed in bore 112.

The connector member 129 is of generally arcuate form, when viewed in front elevation, the forward end 129b of member 129 seating in the recess in the front face of end plate 119 with the radially outer peripheral surface 129b' thereof adjacent the inner periphery of flange 120, thus to be guided thereby. Intermediate the forward and rearward ends of the connector member 129 the said member is of increasing transverse cross-section, such intermediate section likewise being of arcuate form concentric with the valve member 112. The rearward face of the intermediate section 129c is perpendicular to the axis of a through bore 129d provided in the connector member, the forward end 129d of the bore being of arcuate form and conforming to the arcuate transverse cross-section of the forward end 129b.

A sealing ring 130 is provided in the outer surface of enlargement 129a for engagement with the wall of the enlarged forward end of bore 112d.

Connector member 129 is urged into contact with end plate 19 by compression spring 128.

Arcuate port 129d' is in register with the pitch circle of ports 115 to 118, and, on rotation of the valve member, moves into fluid flow connection therewith in succession. The arcuate extent of port 129d' is such that the successive ports 115 to 118 remain isolated one from another during rotation of the valve member, while maintaining at a minimum level the time delay between the closing of one port and the opening of the next succeeding port.

A drain port 131 is provided in the wall of the body part 111 in radial register with the space 132 between the inner face of end plate 119 and the opposing face of the valve member, thus to provide an outlet for fluid fed to such space.

Drive spindle 112b is connected with an hydraulic motor 150 having a high torque/low speed characteristic, the speed of such motor being constant but being variable according to the flow input thereto.

By connecting port 114 to a source of pressure fluid, such pressure fluid can be applied in succession to ports 115 to 118 via blind bore 112c, the inner end of blind bore 112e and blind bore 112d, and the connector member 129, those ports for the time being not in fluid flow connection with port 114 being connected with space 132, and thus drain port 131.

Thus, referring particularly to FIG. 3, the rotary sequence valve having an inlet port 114, an outlet port 132 and flow ports 115 to 118 is connected with the gathering-arm loading equipment for controlling the sequential operation of the thrust rams 30, 30a, 32, 32a and the cam rams 31, 31a thereof.

As will readily be appreciated from a consideration of FIG. 3, the four-stroke cycle of operation of each of sweep arm components 31, 31a, and the out-of-phase operation of the two arm components necessary to give the requisite timed movements of such arm, both as regards translational and rotational motion can be attained. Thus, for example, with the disposition shown in FIG. 3, fluid under pressure will be fed to the back of the piston of ram 32 to pivot the arm inwardly, whilst simultaneously such pressure fluid will be applied to the front of the piston of ram 32a to pivot the related arm component 31a inwardly, rams 30 and 30a being maintained in the condition shown.

Fluid from the opposite faces of the rams 32 and 32a will return to chamber 132 via port 117.

On advance of the valve member so as to bring inlet port 114 into fluid flow connection with port 116, fluid under pressure will be applied to the front of the piston of ram 30 to retract such piston, whilst such fluid will simultaneously be applied to the rear face of the piston of ram 30a to advance such ram. Fluid from the relevant opposite faces of the piston of rams 30, 30a will flow back through port 118 to chamber 132, and thence outwardly through outlet port 131.

The invention is not restricted to the exact features of the embodiment disclosed, since alternatives will readily present themselves to one skilled in the art. Thus, instead of driving the valve by hydraulic motor, an analogous drive means may be utilized.

Provision may be made for indexing the valve manually, if desired.

The invention is not restricted to the exact features of the embodiment herein disclosed, since alternatives will readily present themselves to one skilled in the art. Thus, while it is preferred that the support frame be of box-like form thereby to protect the rams from damage, it is by no means necessary that such a form be adopted, since adequate protection in any particular circumstance may derive from an open framework structure.

Again, while the hydraulic ram arrangement set forth provides a convenient and reliable means for effecting the required movements of the various integers, mechanical means may be adopted for imparting the necessary movements.

The segment-shaped sweep arm components proposed readily lend themselves to pivotal mounting in carriers sealed against the ingress of spoil, but the invention is not limited to the use of sweep arm components of this kind nor to the use of similar or analogous sweep arm components mounted in closed, or substantially closed carriers. In some applications openwork carrier structures may be of application, while generally linear arms may be adequate.

It is to be understood that gathering-arm type loading equipment constructed in accordance with the invention, whether of the particular form herein-disclosed or otherwise, instead of being embodied in a composite drilling machine/loader vehicle or in any other composite multiple-function machine, may be provided as a separate, single-function unit for use alone or in conjunction with other equipment.

I claim:

1. A constant speed, uni-directional rotary sequence valve comprising a body defining a fluid inlet port and a plurality of fluid flow outlet ports, a valve member rotatably mounted in the body and defining a flow passage having a fluid outlet and a fluid inlet, the latter in fluid flow communication with the inlet port, the valve member being rotatable within said body to connect the fluid outlet of said flow passage sequentially with each of the plurality of flow outlet ports, at least one of the fluid outlet of said flow passage and the flow outlet ports of said body being elongated in the direction of movement of the valve member to maintain a maximum fluid flow connection between the flow outlet ports of the body and the fluid outlet of the valve member during limited relative movement between the body and valve member, one of said body and valve member defining another outlet port which is in fluid connection with those flow outlet ports not in fluid flow connection with the outlet of said flow passage, said flow passage outlet and flow outlet ports being configured such that the fluid flow from said flow passage outlet to one of said flow outlet ports ceases before fluid flow from said flow passage outlet to another flow outlet port commences, and drive means for unidirectionally rotating the valve member at a constant rotary speed.

2. A rotary sequence valve as claimed in claim 1, in which the valve member flow passage outlet is elongated in the direction of movement of the valve member.

3. A rotary sequence valve as claimed in claim 2, in which the valve member includes an axially extending spigot defining a portion of said flow passage in register with said inlet port and said flow passage outlet is spaced relative to said flow passage portion, the plurality of flow outlet ports being arranged on a pitch circle in axial register with said flow passage outlet and being sequentially connectable therewith, the valve body defining a chamber for establishing a fluid flow path between the flow outlet ports and said another outlet port, the valve member isolating a flow outlet port fluid connected with the outlet of said flow passage from fluid connection with the chamber.

* * * * *